Nov. 13, 1945.   M. ZATKO   2,388,811
WELDER'S COMFORTING AND ACCESSORY SUSPENSION BELT
Filed Feb. 25, 1944   2 Sheets-Sheet 1

Inventor
Michael Zatko
By Clarence A. O'Brien
and Harvey B. Jacobson
Attorneys

Nov. 13, 1945.  M. ZATKO  2,388,811
WELDER'S COMFORTING AND ACCESSORY SUSPENSION BELT
Filed Feb. 25, 1944   2 Sheets-Sheet 2
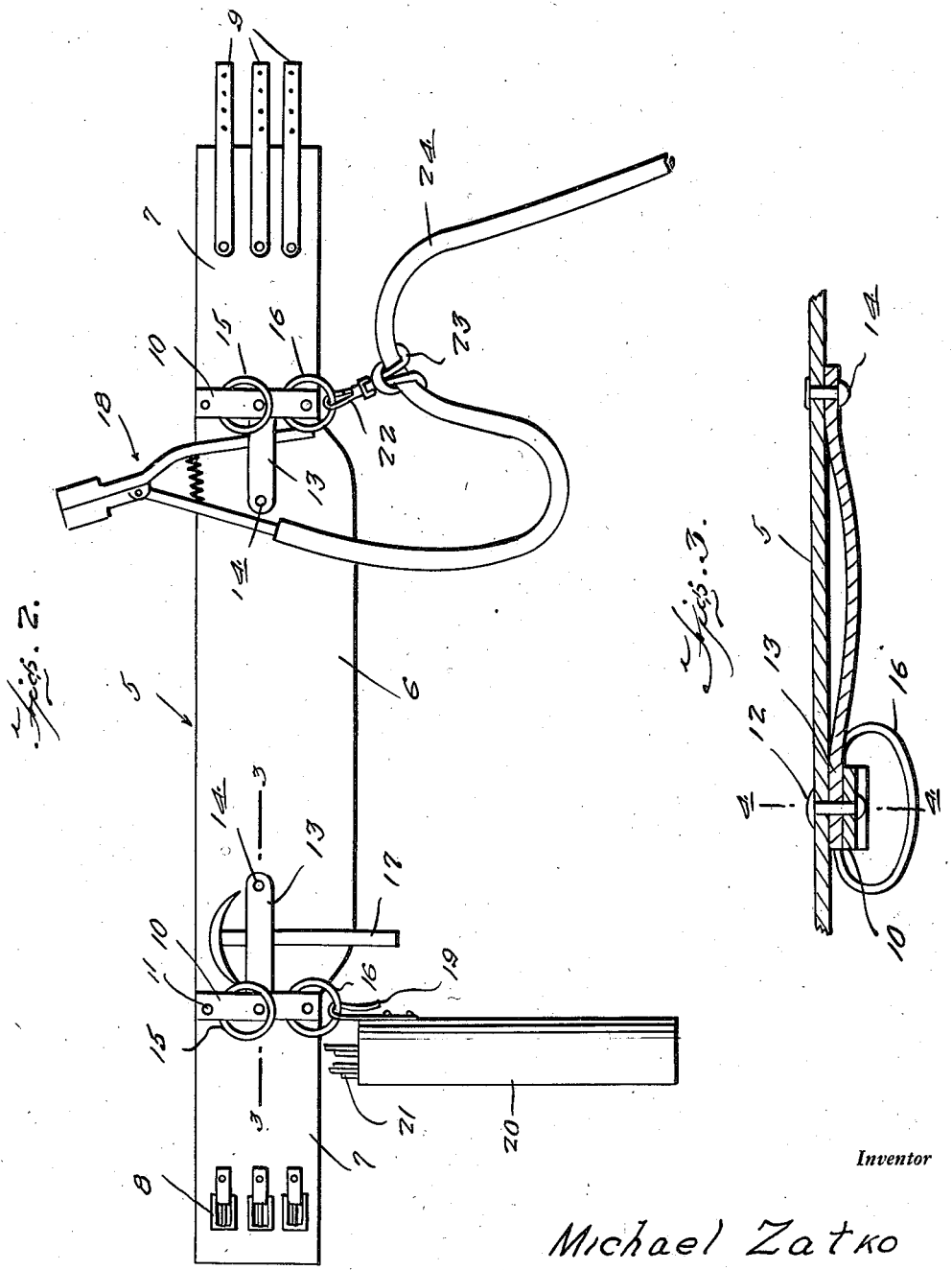
Inventor
Michael Zatko Patented Nov. 13, 1945

2,388,811

UNITED STATES PATENT OFFICE 2,388,811

WELDER'S COMFORTING AND ACCESSORY SUSPENSION BELT

Michael Zatko, Oaklawn, Ill.

Application February 25, 1944, Serial No. 523,854

1 Claim. (Cl. 224—5)

This invention relates to belts and has more specific reference to a wide body embracing type which is adapted to function as a body stress and strain distributing support as well as a handy ways and means of suspending tools and other equipment and accessories thereon.

In carrying out the object of the invention I have provided a simple and expedient belt such as is primarily useful when worn by a welder working from a scaffold or the like, said belt having, at predetermined points, specially constructed and arranged devices so designed and positioned as to suspend tools and equipment for selectively convenient usage.

More specifically, I have fashioned a relatively wide belt which serves as a back and abdomen support and, at the same time, constitutes an appropriate foundation for multiple purpose suspension and accommodation devices suitable to accommodate a welding rod receptacle, a rod holder, a hammer, and the trailing cable associated with the rod holder.

Other features and advantages will become more readily apparent from the following description and the accompanying illustrative drawings.

In the drawings, wherein like numerals are employed to designate like parts throughout the same:

Figure 2 is an elevational or plan view of the belt per se, this also serving to show the special adapters or suspension devices for tools and accessories.

Figure 3 is an enlarged horizontal section on the plane of the line 3—3 of Figure 2 looking downwardly in the direction of the arrows.

Figure 1:
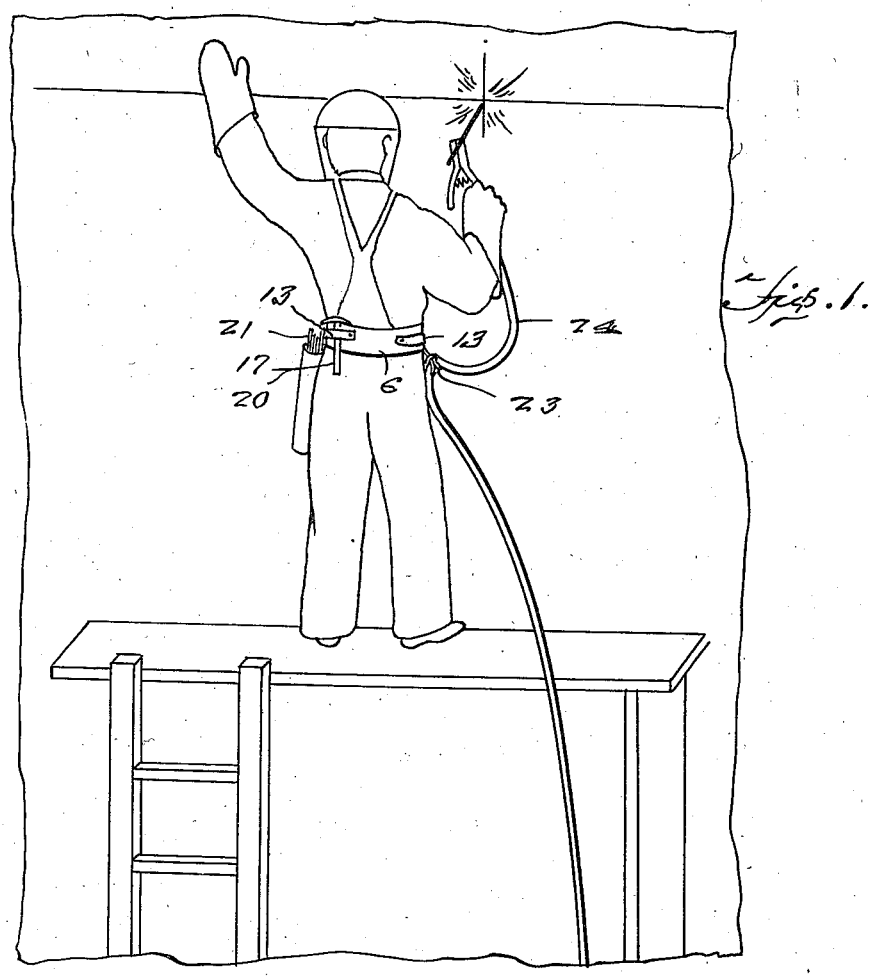
Figure 1 is a perspective view showing a welder on a scaffold and disclosing the improved belt and the manner in which it is generally used.
Figure 4:
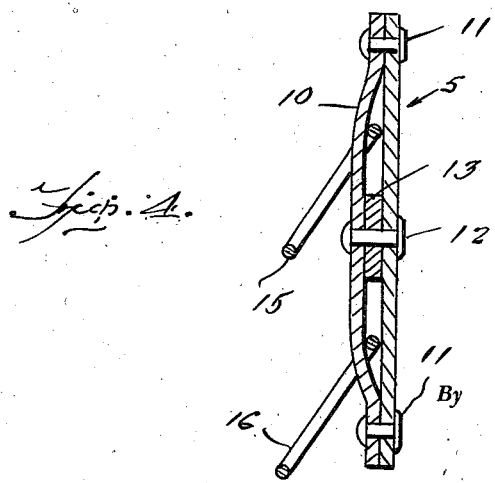
Figure 4 is an enlarged section which may be said to be taken approximately on the line 4—4 of Figure 3.

Referring now to the drawings by distinguishing reference numerals it will be observed that the belt proper is denoted by the numeral 5. This is of leather or other equivalent material and is a wide band type. More specifically, the central web portion 6 is wider than the free end portions 7 and is adapted to provide a comforting and conforming fit and to thus serve as a sort of back-brace. The ends extend around to the front and over the abdomen to serve as an abdominal brace and these are provided with suitable buckles 8 at one end to accommodate the buckle-straps 9 at the opposite end. At the juncture portion of the central part 6 and the ends 7 I provide a pair of longitudinally spaced substantially T-shaped adapters. Each adapter is the same in construction and a description of one will suffice for both. Bearing this in mind, the adapter comprises a transverse or so-called vertical strap 10 which, as shown in Figure 4, is riveted or otherwise secured in place at opposite ends by rivets 11. There is a central rivet 12 which fastens the corresponding portion of the strap 10 to the belt and this also serves to secure in place a short-length collateral or auxiliary strap 13. The latter is horizontally disposed and has its free end riveted down on the belt as indicated at 14. Under this arrangement the portions of the strap 10 above and below the strap 13 define pocket-like loops to accommodate suspension rings 15 and 16.

As brought out to advantage in Figure 4, the strap end of the part 13 between the belt 5 and strap 10 constitutes a spacing element to fashion the loops for the rings 15 and 16. The strap 13 constitutes a conveniently located hanger or suspension element which may be used in various ways.

In use and as a general proposition one of the straps 13 serves as a convenient keeper for a welder's hammer 17. The other strap serves as a hanger for the welding rod holder 18. The hammer and the rod holder are, of course, interchangeable. The hanger or suspension rings 15 and 16 may be variously employed. As shown in Figure 2 one ring constitutes a convenient hanger for engagement by the hook 19 on the receptacle-type holder 20 for a batch of welding rods or sticks 21. One of the rings at the right is shown accommodating a snap-hook 22 fastened as at 23 to the cable 24, that is, to the trailing cable which is attached to the electric welding rod holding tool or device 18.

The T-shaped adapter straps are at predetermined points to distribute the load and to put the same in convenient positions for ready accessibility when used along the lines indicated.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A workman's belt comprising a body having separable fastening means at its ends, the intermediate rear portion of said body being wider than end portions thereof and serving as a back support, and article-holding means at ends of the wide intermediate portion of said body, each consisting of a vertical strip extending transversely of the body and secured at its ends to upper and lower portions of the body, a horizontal strip extending longitudinally of the body and having one end secured to the body and its other end extending under the vertical strip midway the length thereof, a fastener passing through overlapped portions of said strips and through said body, and article-holding rings loosely engaged about the vertical strip above and below the horizontal strip.

MICHAEL ZATKO.